March 7, 1939.                G. E. STANLEY                2,150,083
PLATE CLUTCH
Filed Jan. 25, 1937            2 Sheets-Sheet 2

INVENTOR
George Enoch Stanley
BY
Mawhinney & Mawhinney
ATTORNEYS

Patented Mar. 7, 1939

2,150,083

UNITED STATES PATENT OFFICE 2,150,083

PLATE CLUTCH

George Enoch Stanley, Coventry, England

Application January 25, 1937, Serial No. 122,276
In Great Britain January 31, 1936

12 Claims. (Cl. 192—68)

This invention relates to plate clutches of the kind having a driven disc which, when the clutch is engaged, is clamped against a driving face of the clutch by a spring-pressed presser-plate which has a sliding and driving connection with a driving portion of the clutch.

My main object is to provide an improved form of plate clutch with which very sweet clutch engagement will be obtained.

According to the invention the presser-plate is lightly biased in the disengaging direction, whilst the clutch-withdrawal levers act not on the presser-plate but on the clutch-engaging springs therefor, rather in the manner of the flexible multi-piece presser-plate disclosed in my patent specification No. 2,063,203.

Preferably the sliding support is effected at the inner periphery of the presser-plate, as by axially-extending pins carried thereby and passing through holes in a steel plate secured to the driving portion.

In the accompanying drawings:—

Figure 1:
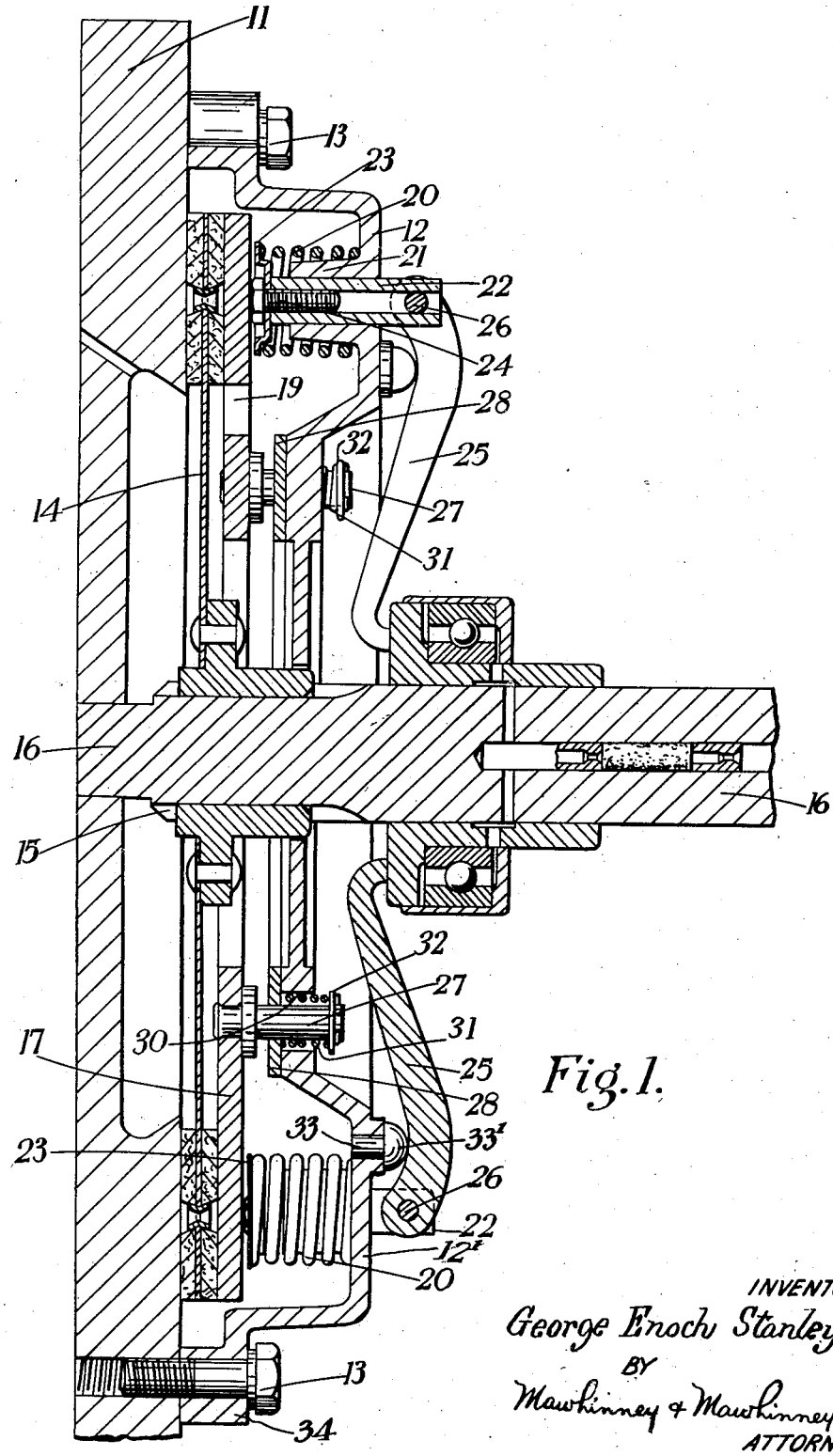
Figure 2:
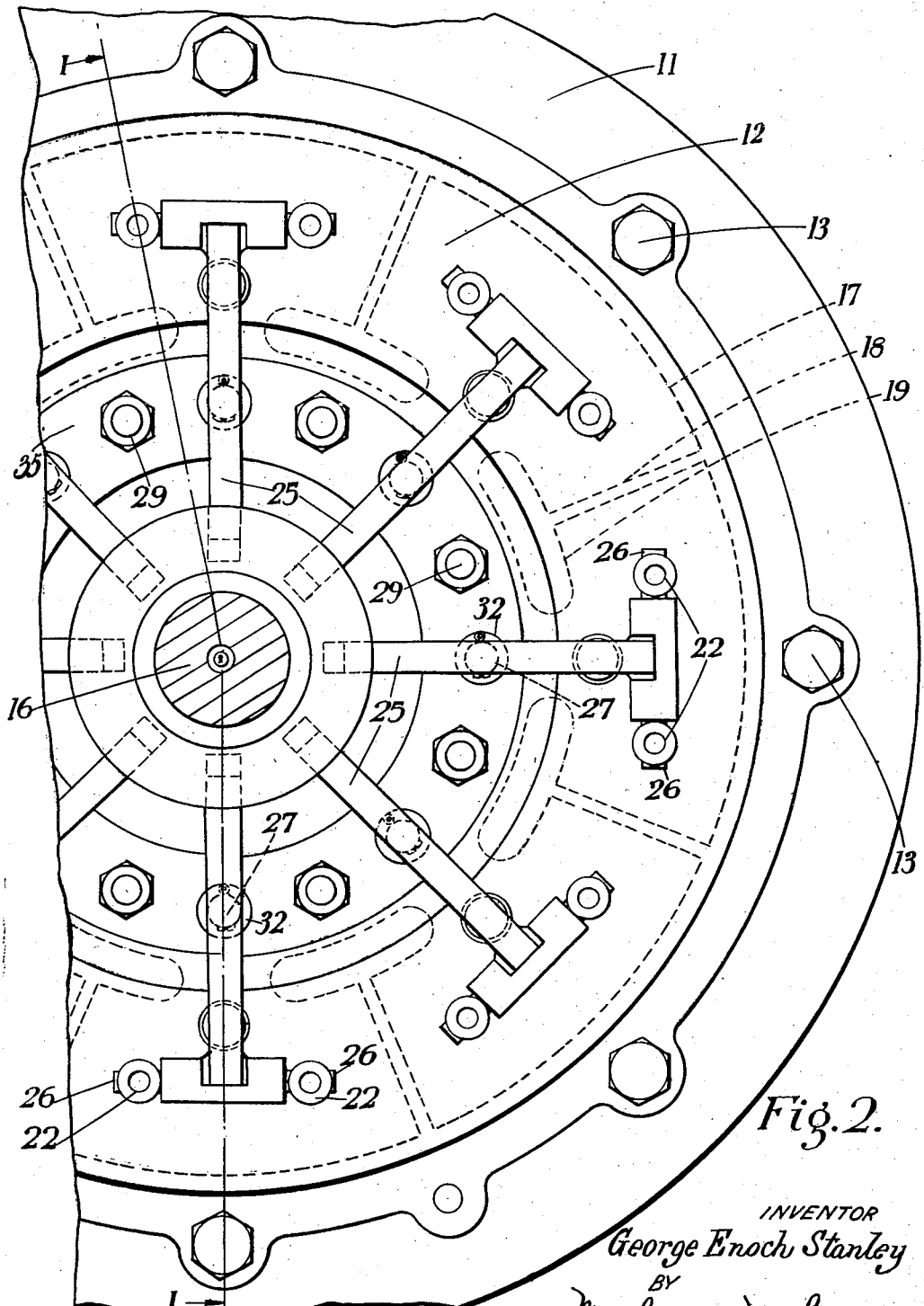

Figure 1 is a sectional elevation through one form of clutch according to the invention, the section being taken on the line I—I of Figure 2; and Figure 2 is a fragmentary end view thereof.

In the construction illustrated, 11 represents a driving flywheel with an aluminium casing 12 rigidly secured thereto, as by bolts 13. 14 is the driven clutch disc slidably splined at 15 on the driven clutch shaft 16. The presser-plate 17, which is a rigid one, has a number of radial slits 18 extending from its outer periphery approximately midway across its radial width, where the slits are joined to the centres of arcuate slots 19 whereby the presser-plate 17 is provided with an inner ring 17'. In this way the outer peripheral surface of the presser-plate is divided up into a number of arcuate sections, eight, for example. A pair of clutch-engaging springs 20 is associated with each section, each consisting of a helical spring centered on a boss 21 in the casing 12 and bearing on a flat surface fast with a pin 22 slidably mounted in the boss. In the present instance the flat surface is provided by washer 23 secured to the pin by a bolt 24. The head of the bolt contacts with the adjacent face of the presser-plate and thus exerts upon it the pressure of the spring over a very small area.

The withdrawal levers 25 are associated with these pins in any convenient manner—preferably one withdrawal lever to each adjacent pair of pins—so that when the clutch withdrawal mechanism is operated to release the clutch the pins will be withdrawn to relieve the presser-plate from the pressure of the clutch-engaging springs. The drawings show each lever carrying a cross pin 26 the ends of which are engaged with the adjacent pins 22.

The support of the presser-plate is effected by a plurality of pins 27, eight, for example, lying beneath the levers and riveted or otherwise secured to the presser-plate in a circle which is radially inwardly of the arcuate slots 19. These pins 27 slidably extend through holes in a steel ring 28 bolted at 29 to the casing 12. The latter has formed in it aligned clearance holes 30 in which are mounted relatively light springs 31 acting against abutments 32 on the pins to bias the presser-plate in the clutch-disengaging direction—and in point of fact effecting disengagement of the clutch automatically when the clutch withdrawal mechanism is operated to relieve the presser-plate of the pressure of the clutch-engaging springs 20. It will be seen that the disengaging springs 31 are arranged in a circle of smaller radius than that in which the engaging springs 20 are arranged and that the latter are angularly displaced relatively to the former. The casing 12 is provided with an annular bulged-out portion 12' in which the springs 20 are disposed. This bulged-out portion has mounted thereon the part 33, in the present instance being shown in the form of studs, having bearing edges 33' which provide fulcrum points for the levers 25. The casing 12 is also provided with an outer peripheral part 34, adapted to be bolted to the fly wheel 11. Moreover, the casing 12 is provided with a flange 35 to which the ring 28 is bolted.

With the clutch above described the presser-plate is prevented from being distorted through heat, and it is pressed on to the fabric or other lining of the driven clutch disc at a number of points—sixteen points in the example given. Obviously, for smaller clutches, the periphery of the presser-plate could be split up into, say, six arcuate sections with correspondingly fewer clutch-engaging springs, etc.

In this way the whole of the friction surface is used in a satisfactory manner. The presser-plate, moreover, is not distorted by the spring pressure of the clutch-engaging springs as the pressure of these is removed when the clutch is to be disengaged.

What I claim as my invention and desire to secure by Letters Patent of the United States is:—

1. A plate clutch comprising a driving member, a driven member, a presser-plate for clamping said driven member against said driving member, means slidingly supporting said presser-plate from said driving member, spring means lightly biassing said presser-plate in the disengaging direction, more than five stronger springs acting on said presser-plate to hold it in the clamping position, clutch-withdrawal levers, and means interconnecting said levers and said stronger springs whereby on the operation of said levers the pressure of said stronger springs will be removed from said presser-plate to allow disengagement thereof under the action of said lighter spring means.

2. A plate clutch comprising a driving flywheel, a casing rigidly secured thereto, a driven disc, a rigid annular presser-plate for clamping said driven disc against said driving flywheel when the clutch is engaged, means slidingly supporting said presser-plate from said casing near the inner periphery of said presser-plate, spring means lightly biassing said presser-plate in the disengaging direction, more than five stronger springs acting on said presser-plate to hold the clutch engaged, clutch-withdrawal levers, and means interconnecting said levers and said stronger springs whereby on the operation of said levers the pressure of said stronger springs will be removed from said presser-plate to allow disengagement of the clutch under the action of said lighter spring means.

3. A plate clutch comprising a driving member, a driven member, a rigid annular presser-plate for clamping said driven member against said driving member when the clutch is engaged, axially-extending pins carried in a circle at the inner periphery of said presser-plate, said pins co-acting with the driving member for slidingly supporting said presser-plate therefrom, spring means lightly biassing said presser-plate in the disengaging direction, more than five stronger springs acting on said presser-plate to hold the clutch engaged, clutch-withdrawal levers, and means interconnecting said levers and said stronger springs whereby on the operation of said levers the pressure of said stronger springs will be removed from said presser-plate to allow disengagement of the clutch under the action of said lighter spring means.

4. A plate clutch comprising a driving member, a driven member, a rigid annular presser-plate for clamping said driven member against said driving member when the clutch is engaged, axially-extending pins carried at the inner periphery of said presser-plate, a steel ring carried by the driving member, said ring having holes which slidingly receive said pins to support said presser-plate from the driving member, more than five springs acting on said presser-plate to hold the clutch engaged, clutch-withdrawal levers, and means interconnecting said levers and said springs whereby on the operation of said levers the pressure of said springs will be removed from said presser-plate to allow disengagement of the clutch.

5. A plate clutch comprising a driving member, a driven member, a rigid annular presser-plate for clamping said driven member against said driving member when the clutch is engaged, axially-extending pins carried in a circle at the inner periphery of said presser-plate, said pins co-acting with the driving member for slidingly supporting said presser-plate therefrom, helical springs disposed around said pins and acting to lightly bias said presser-plate in the disengaging direction, more than five stronger springs acting on said presser-plate to hold the clutch engaged, clutch-withdrawal levers, and means interconnecting said levers and said stronger springs whereby on the operation of said levers the pressure of said stronger springs will be removed from said presser-plate to allow disengagement of the clutch under the action of said helical springs.

6. A plate clutch comprising a driving member, a driven member, a relatively rigid presser-plate for clamping said driven member against said driving member when the clutch is engaged, means slidingly supporting said presser-plate from the driving member, spring means lightly biassing said presser-plate in the disengaging direction, clutch-withdrawal levers, pins slidingly carried by the driving member and pivoted to said levers, said pins extending towards said presser-plate, washers secured to said pins, and stronger springs acting between said washers and said driving member to force said pins axially to hold said presser-plate in the clamping position, whereby on the operation of said levers to remove the pressure of said stronger springs the clutch will be disengaged under the action of said lighter spring means.

7. In a clutch, drive and driven members, a presser-plate for urging the two members together, said presser plate composed of an inner continuous ring with angularly displaced circumferential slots outwardly of the ring portion and with slits extending radially from intermediate portions of the slots outwardly through the outer edge of the plate dividing said plate into a plurality of relatively movable presser feet, a plurality of actuating devices engaging each foot for normally urging the foot to cause clutching engagement between said members, means to withdraw said actuating devices from pressing engagement against said feet, means for engaging the solid ring portion of the presser plate for supporting said plate from one of said members, and yieldable means connected to the ring portion of said presser plate for acting to withdraw the presser plate from pressing engagement when said actuating devices are withdrawn therefrom.

8. In a clutch, drive and driven members, a presser plate movably mounted to press said members together into driving engagement, said presser plate including a solid ring portion and numerous outer flexibly supported feet movable independently of one another, means connected to the solid ring portion of the plate and to one of said members for biasing the plate to a declutched position, numerous devices grouped circumferentially for urging said feet toward the members and including a plurality of such devices for each foot, said plurality of devices being radially offset from the declutching means, and means for withdrawing said devices from pressing engagement against said feet.

9. In a clutch, drive and driven members, a presser plate for urging said members together into clutching engagement and composed of an inner ring and outer feet flexibly mounted from said ring and movable individually axially of the plate, bolts extending between said ring and one of said members, yieldable means associated with said bolts for urging the plate to declutched position, numerous other bolts carried by one of said members unconnected with the presser plate and having movable contact therewith to urge the plate into clutching position, stronger springs associated with said last mentioned bolts, said last mentioned bolts and springs being in great numbers distributed around the axis of the clutch, and means for withdrawing the last mentioned bolts from pressing engagement against said feet.

10. A plate clutch comprising a driving member, a driving casing secured thereto, a driven member, an annular presser-plate for clamping said driven member against said driving member when the clutch is engaged, axially-extending pins carried near the inner periphery of said presser-plate, a steel ring carried by said driving casing, said ring having holes which receive said pins to slidingly support said presser-plate from said driving casing, more than five symmetrically-disposed springs acting on said presser-plate to hold the clutch engaged, clutch withdrawal levers disposed against the face of said driving casing remote from said presser-plate, pins slidingly extending through said driving casing and connected to the radially outer ends of said levers, and means interconnecting said latter pins and said springs whereby on the operation of said levers the engaging pressure of said springs will be removed from said presser-plate to allow disengagement of the clutch.

11. A plate clutch comprising a driving member, a driving casing secured thereto, a driven member, an annular presser-plate for clamping said driven member against said driving member when the clutch is engaged, axially-extending pins carried near the inner periphery of said presser-plate, said pins coacting with said driving casing for slidingly supporting said presser-plate therefrom, more than five springs acting on said presser-plate to hold the clutch engaged, said driving casing having an annular bulged-out portion, in which said springs are disposed, extending axially beyond where said pins are slidingly supported, clutch withdrawal levers disposed adjacent that face of said driving casing remote from said presser-plate, parts, with bearing edges providing fulcrum points for said levers, mounted on said bulged-out portion, and means interconnecting said levers and said springs whereby on the operation of said levers the pressure of said springs will be removed from said presser plate to allow disengagement of the clutch.

12. In a plate clutch, a driving member, a driven member, a presser-plate, actuating levers, a driving casing formed of an aluminium alloy, said casing having an axially-extending portion with at one end an outer peripheral part adapted to be bolted to said driving member and at the other end a radially-inwardly-extending flange portion, the radially-inner part of said flange portion being axially-offset in the direction towards said driving member and having bolted thereto a steel ring, supporting pegs fast with said presser-plate and slidingly engaged in holes in said steel ring, a plurality of springs disposed in said driving casing adjacent the radially-outer part of said flange portion, said springs acting for urging said presser-plate in a direction to clamp said driven member against said driving member, means connecting the outer ends of said levers with said springs whereby on the operation of said levers the engaging pressure of said springs can be removed from said presser-plate, and studs carried by said radially-outer part of said flange portion on the side remote from said driving member, said studs disposed intermediate the ends of said levers and having rounded surfaces acting as fulcrums therefor.

GEORGE ENOCH STANLEY.